(12) United States Patent
Luo et al.

(10) Patent No.: US 10,423,329 B2
(45) Date of Patent: Sep. 24, 2019

(54) APPARATUS, METHOD AND COMPUTER PROGRAM PRODUCT FOR INFORMATION PROCESSING AND KEYBOARD DISPLAY

(71) Applicant: LENOVO (Singapore) PTE. LTD., New Tech Park (SG)

(72) Inventors: Jun Luo, Yokohama (JP); Hiroshi Itoh, Sagamihara (JP); Ryohta Nomura, Yamato (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 216 days.

(21) Appl. No.: 15/374,876

(22) Filed: Dec. 9, 2016

(65) Prior Publication Data

US 2017/0168710 A1    Jun. 15, 2017

(30) Foreign Application Priority Data

Dec. 10, 2015    (JP) .................................. 2015-241442

(51) Int. Cl.
*G06F 3/0488*    (2013.01)
(52) U.S. Cl.
CPC ...... *G06F 3/04886* (2013.01); *G06F 3/04883* (2013.01); *G06F 2203/04803* (2013.01); *G06F 2203/04808* (2013.01)
(58) Field of Classification Search
CPC ............. G06F 3/04886; G06F 3/04883; G06F 2203/04803; G06F 2203/04808
See application file for complete search history.

(56) References Cited

U.S. PATENT DOCUMENTS

| 2015/0331588 A1* | 11/2015 | Ishida ................. G06F 3/04812 715/765 |
| 2015/0347008 A1* | 12/2015 | Oldziejewski ........ G06F 3/0481 715/773 |
| 2015/0356994 A1* | 12/2015 | Denoue ................ G11B 27/031 386/278 |
| 2016/0062489 A1* | 3/2016 | Li ....................... G06F 3/03543 345/163 |

(Continued)

FOREIGN PATENT DOCUMENTS

| JP | 2002358153 A | 12/2002 |
| JP | 2004341813 A | 12/2004 |
| JP | 2012203497 A | 10/2012 |

(Continued)

*Primary Examiner* — Shourjo Dasgupta
(74) *Attorney, Agent, or Firm* — Kunzler Bean & Adamson

(57) ABSTRACT

An apparatus, method and computer program product for information processing and keyboard display are disclosed. The apparatus includes: a touch operation detection unit to detect a touch operation; a determination unit to determine whether the touch operation is a touch operation in a home position; and a control unit that changes a key change area to a correction key if the touch operation is a touch operation in the home position. The method includes: determining a simultaneous touch operation of at least two points in a sensing area; and displaying a correction key in a preset display change area. The computer program product includes software keyboard display processing for: determining a simultaneous touch operation of at least two points in a sensing area, and displaying a correction key in a present display change area.

15 Claims, 6 Drawing Sheets

(56) References Cited

U.S. PATENT DOCUMENTS

2016/0132233 A1* 5/2016 Ghassabian ........... G06F 3/0237
                                                         715/773

FOREIGN PATENT DOCUMENTS

| JP | 2013058081 A | | 3/2013 | |
|---|---|---|---|---|
| JP | 2014170427 A | | 9/2014 | |
| JP | 2014176019 A | | 9/2014 | |
| JP | 2014183485 A | | 9/2014 | |
| JP | 02015111479 A | * | 6/2015 | ........... G06F 3/0488 |

* cited by examiner

| KEY CHANGE AREA | TYPE OF CORRECTION KEY |
|---|---|
| RIGHT SIDE OF SPACE KEY | BACKSPACE KEY |
| . . . . . | . . . . . |
| . . . . . | . . . . . | ism" id="page-1" # APPARATUS, METHOD AND COMPUTER PROGRAM PRODUCT FOR INFORMATION PROCESSING AND KEYBOARD DISPLAY

CROSS-REFERENCE TO RELATED APPLICATIONS

Foreign: This patent application claims priority to Japan Patent Application No. JP2015-241442 filed on 10 Dec. 2015 for Luo, et. al, the entire contents of which are incorporated herein by reference for all purposes.

FIELD

The subject matter disclosed herein relates to an information processing apparatus, a software keyboard display method, and a program.

BACKGROUND

Recently, portable computing devices, such as tablet personal computers, smartphones, PDA's (Personal Digital Assistants), and electronic book readers have become widely available, most of which use touch panels as display units. Such portable computing devices often use a software keyboard, an OSK ("On Screen Keyboard") or a screen keyboard to allow a user to operate the keyboard displayed on a touch panel to carry out input operations.

However, software keyboards offer no tactile feedback as to the location of individual keys, and correction keys on such keyboards are located far away from the "home position" that serves as a reference for key positions. Relocation of the hands to perform correction actions combined with a lack tactile feedback as to individual key locations lead to an increase in typing errors and a decrease in typing speed.

SUMMARY

An apparatus, method and computer program product for information processing and keyboard display are disclosed.

The apparatus includes a touch operation detection unit that detects touch operations to the software keyboard. The apparatus includes a determination unit that determines whether the touch operations are made in a home position on the software keyboard. The apparatus includes a control unit that changes a key change area to a correction key if the touch operations are made in the home position on the software keyboard.

The method includes determining whether a touch operation of at least two points is made in a sensing area of an electronic apparatus; and displaying a correction key in a preset area after determining that the touch operation of at least two points is made in the sensing area.

The computer program product includes processing for a software keyboard in a sensing area in that touch operations are detectable, which includes determining a simultaneous touch operation of at least two points in the sensing area; and displaying a correction key in a preset display change area after determining that the touch operation of at least two points is made in the sensing area.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
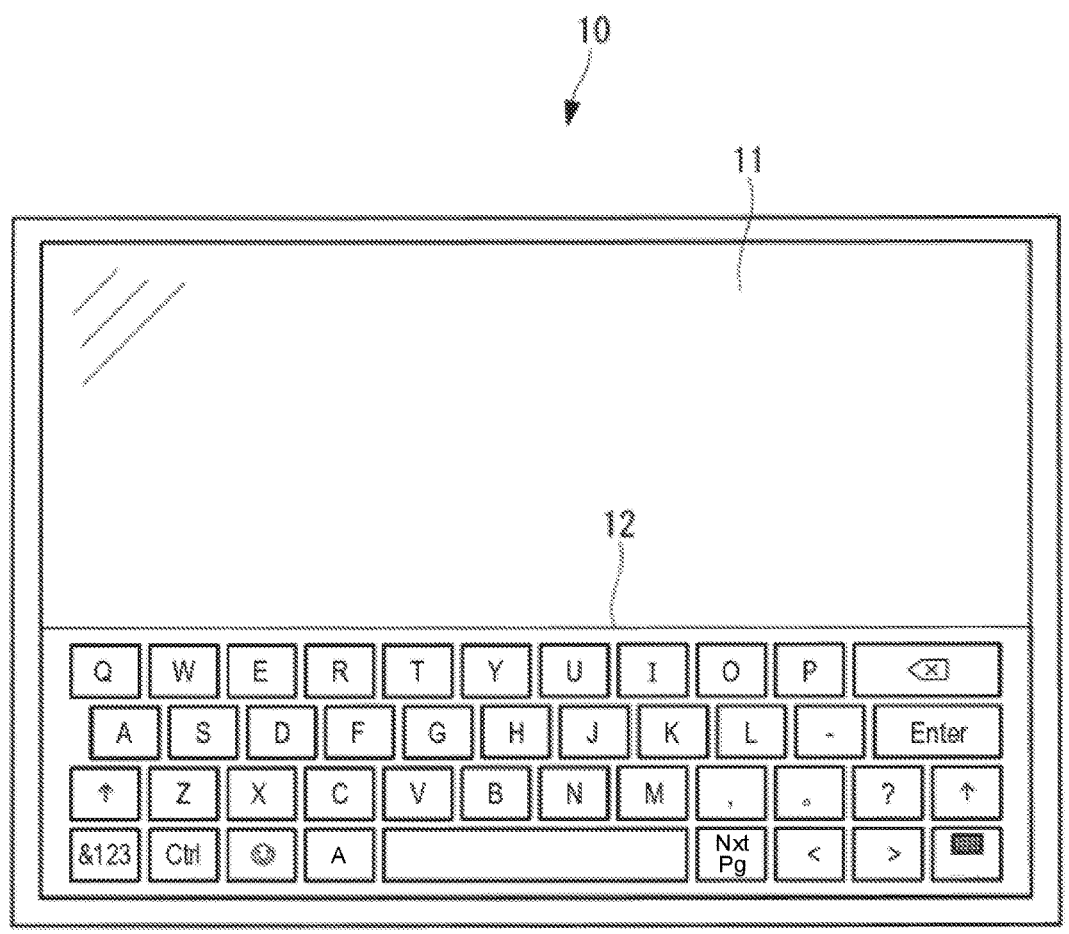
FIG. 1 is a schematic appearance diagram illustrating one embodiment of a portable computing apparatus.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred to hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. Such code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding Figures. Like numbers refer to like elements in all Figures, including alternate embodiments of like elements.

One embodiment of an information processing apparatus, a software keyboard display method, and a computer program product will be described below with reference to the accompanying drawings. In this embodiment, a tablet personal computer (hereinafter called a "tablet PC"), used as one example of a portable computing apparatus, will be described as one aspect of the information processing apparatus. Other examples of portable computing apparatuses include smartphones, PDA's, and an electronic book browsing terminals.

FIG. 1 is a schematic appearance diagram illustrating one embodiment of a portable computing apparatus 10. The portable computing apparatus 10 has a touch panel 11. The touch panel 11 functions not only as an input unit that allows a user to perform input operations but also as a display unit that presents information to the user. Thus, the touch panel 11 has both an input function and a display function. A software keyboard 12 can be displayed on the touch panel 11. The user performs touch operations on the software keyboard to enter character input and the like.

Figure 2:
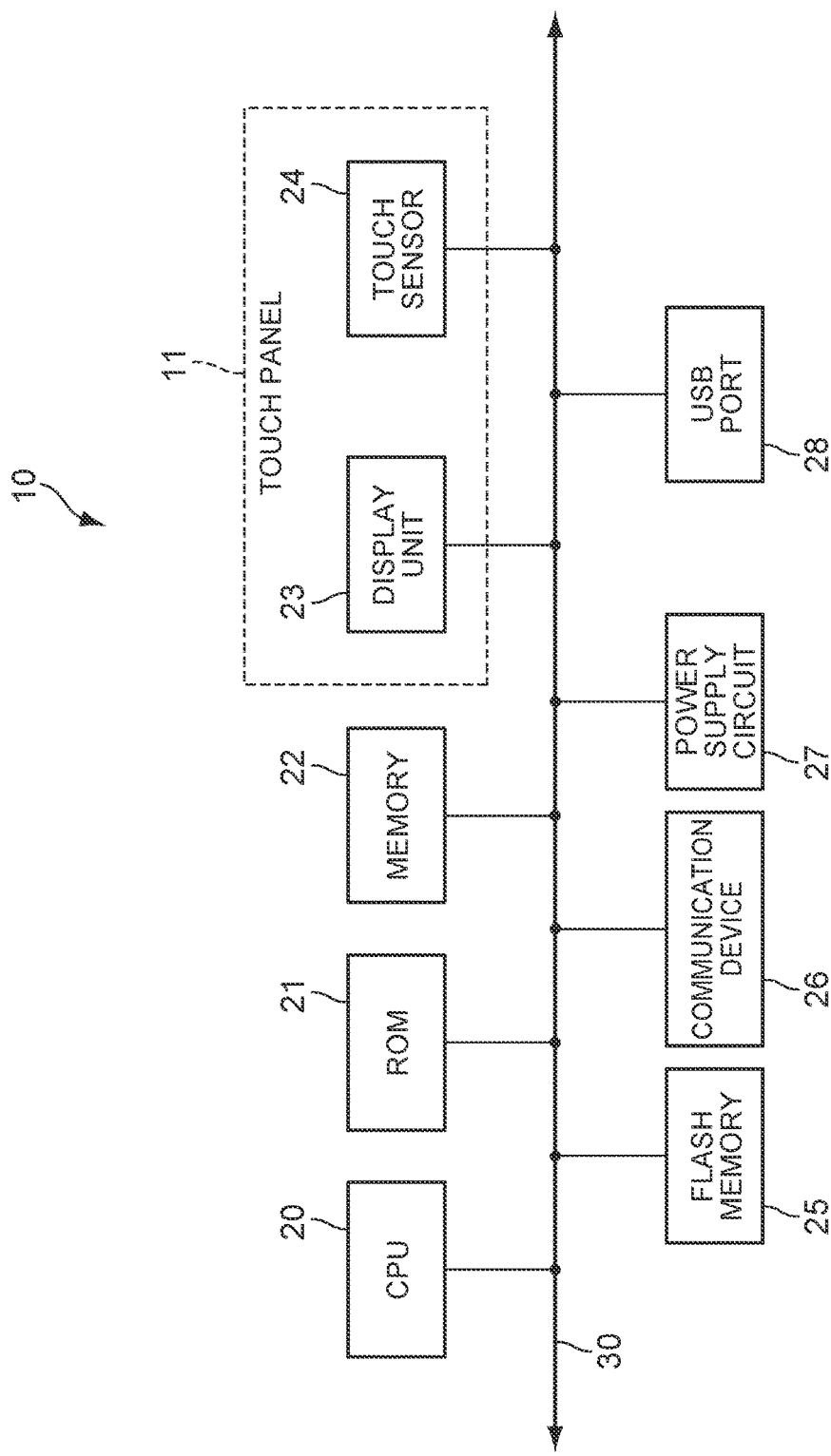
FIG. 2 is a schematic diagram illustrating a hardware configuration of one embodiment of a portable computing apparatus.

FIG. 2 is a schematic diagram illustrating the hardware configuration of one embodiment of the portable computing apparatus 10. This embodiment of the portable computing apparatus 10 includes a CPU (Central Processing Unit) 20, a ROM (Read Only Memory) 21, a memory 22, a display unit 23, a touch sensor 24, a flash memory 25, a communication device 26, a power supply circuit 27, and a USB (Universal Serial Bus) port 28. These units are connected directly or indirectly through a bus 30. The touch panel 11 includes the display unit 23, the touch sensor 24, and the like.

The CPU 20 controls the entire portable computing apparatus 10 through the bus 30 using an OS (Operating System) stored, in some embodiments, in the flash memory 25. The CPU 20 also performs processing based on various programs stored in the flash memory 25, including keyboard display processing, which will be described later.

The ROM 21 stores a BIOS (Basic Input/Output System), and other data.

The memory 22 comprises a writeable memory, such as a cache memory, a RAM (Random Access Memory), or other writable memory. The memory 22 is used as a work area to read a program to be executed by the CPU 20 and write data processed by the execution program.

The display unit 23 comprises an LCD to provide a display under the control of the CPU 20.

The touch sensor 24 is arranged to be superimposed on a display screen of the display unit 23. When detecting a user's touch operation, the touch sensor 24 detects the position coordinates of the detected touch operation on the display screen. The touch sensor 24 is not limited to a contact type of sensor, and may be of a non-contact type of sensor. Throughout this description, the term "touch operation" means that the touch sensor 24 is put into a detectable state, which may be achieved by applying pressure while in contact with the touch sensor 24, contacting the touch sensor 24 without applying pressure, and coming close to the touch sensor 24 without being in contact with the touch sensor 24, or by other appropriate means.

Throughout this description, a "sensing area" means an area in which the touch operation is detectable by the touch sensor 24.

In some exemplary embodiments, the flash memory 25 stores an OS, such as Windows®, iOS® or Android®, to control the entire portable computing apparatus 10, various drivers to perform hardware operations on peripheral devices, applications for specific tasks, and various data and files. The portable computing apparatus 10 may also be equipped with any other memory unit, such as an HDD (Hard Disk Drive), as an alternative to the flash memory 25.

The communication device 26 controls communication with other devices through a network.

The power supply circuit 27 includes an AC adapter, an intelligent battery, a charger used to charge the intelligent battery, a DC/DC converter, and the like to supply power to each device under the control of the CPU 20.

The USB port 28 is an external connection terminal used to connect another device such as an external storage device.

Figures 3, 4:
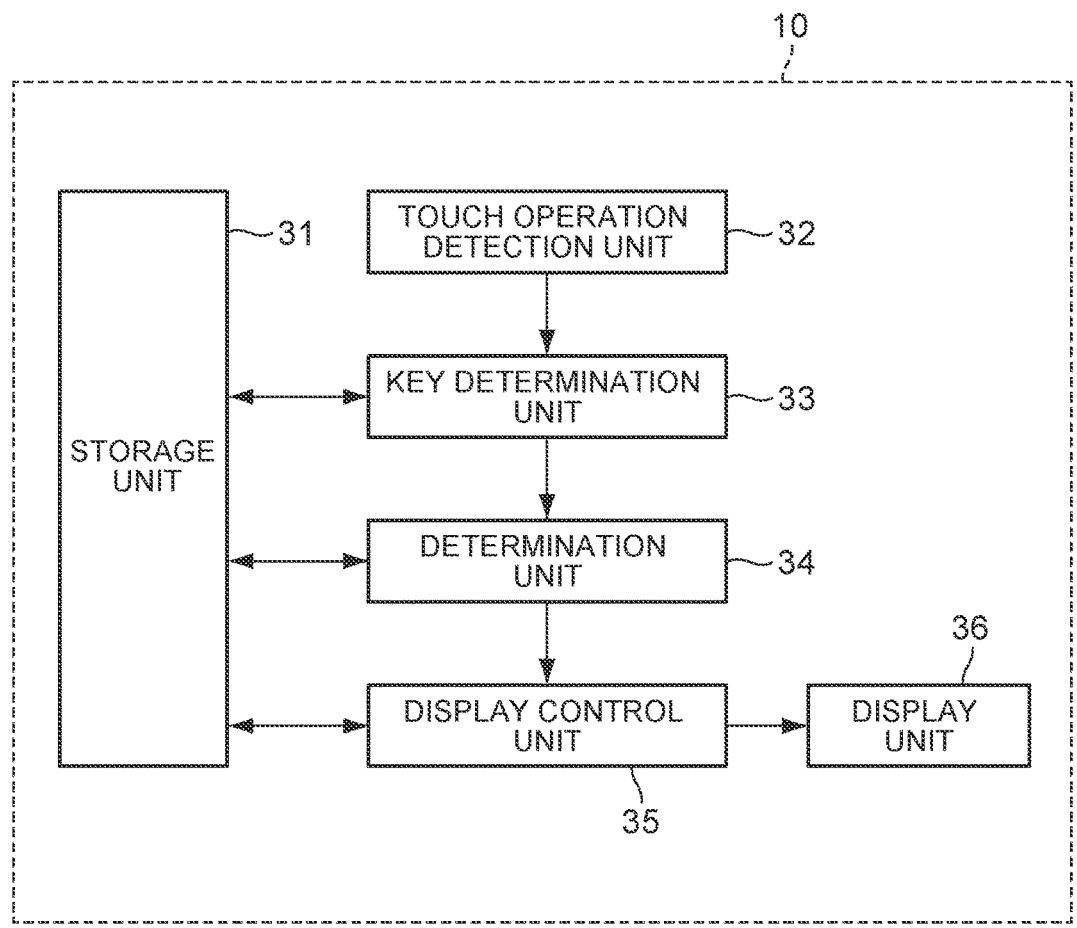
FIG. 3 is a functional block diagram illustrating a keyboard display function of one embodiment of a portable computing apparatus.
FIG. 4 is a schematic block diagram illustrating a key change table of one embodiment of a key change table.

FIG. 3 is a functional block diagram illustrating a keyboard display function of one embodiment of the portable computing apparatus 10. As illustrated in FIG. 3, the portable computing apparatus 10 includes a storage unit 31, a touch operation detection unit 32, a key determination unit 33, a determination unit 34, a display control unit 35, and a display unit 36.

In some embodiments, the storage unit 31 is a function implemented by the flash memory 25 in FIG. 2 to store the layout of the software keyboard, and the like. Furthermore, various pieces of information necessary to implement the keyboard display function, such as an input conversion table, a touch operation determination table, and a key change table (display change information), are stored in the storage unit 31.

The input conversion table is a table in which the position coordinates on the display screen are associated with the key arrangement. This input conversion table is updated by the display control unit 35 each time the display of the display screen is changed.

The touch operation determination table is a table in which the content of each touch operation is associated with a determinant item defined by the touch operation. For example, the content of a touch operation as a "simultaneous touch operation of two or more keys" is registered for a determinant item as "home position."

In some embodiments, as a more specific example, the content of a touch operation as a "simultaneous touch operation of at least two keys of "F," "D," "S," "A," "J," "K," "L," and "-" is associated with the determinant item as "home position," but the embodiments are not limited thereto. A key located in the home position may be any other key depending on the key arrangement of the software keyboard.

Though in the above example it is defined that the simultaneous touch operation of two or more keys on the software keyboard already displayed is a touch operation in the home position, the embodiments are not limited to this configuration. For example, a simultaneous touch operation to any two points on the touch panel can be defined as the touch operation in the home position even if the points do not coincide with the positions of specific two or more keys on the software keyboard. The any two points on the touch panel preferably comprise two or more points on or near the software keyboard, and more preferably comprise touch operations to two or more keys located in the home position. A home position reset operation to redisplay the software keyboard by changing the display position and size of the software keyboard and the size and spacing of keys can also be carried out by detecting the simultaneous touch operation made to any two points on the touch panel.

As illustrated in FIG. 4, the key change table is a table in which each key change area is associated with a type of correction key. The key change area is an area defined to be changed to a correction key when a touch operation in the home position is detected. The key change area is at least a part of at least one key, which can be registered, for example, as a part of one key, as the whole of one key, or as part or all of two or more keys. The key change area (display change area) can also comprise an area other than areas corresponding to keys of the software keyboard. For example, an area near the software keyboard may be registered as the key change area. Furthermore, an area including a key or keys and an area other than areas corresponding to a key or keys on the software keyboard may be registered as the key change area.

Figure 5:
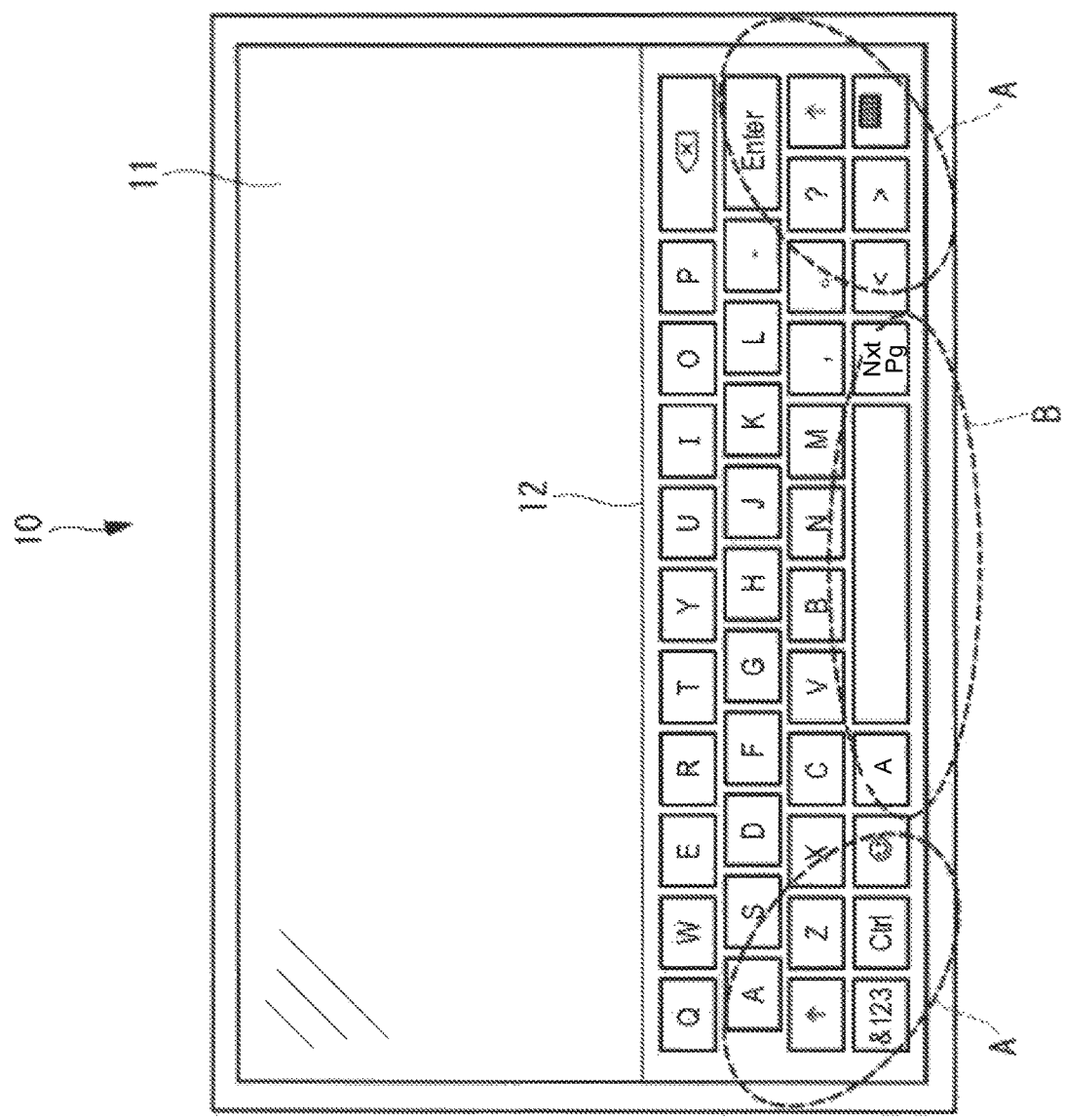
FIG. 5 is a diagram illustrating ranges suitable for key change area settings of one embodiment of a portable computing apparatus.

The key change area is preferably set to an end part of the software keyboard 12 (for example, "area A" in FIG. 5) in or below the row with "F" key displayed, or an area located in a central portion of the software keyboard in or below the row with "F" key displayed ("area B" in FIG. 5). An area of any one or some of "F," "D," "S," "A," "J," "K," "L," and "-" located in the home position can also be set as the key change area. Displaying a correction key in such an area allows the user to operate the correction key without moving user's hands away from the home position.

More preferably, the key change area is set in a part of a space key. Setting the key change area in a part of the space key enables effective use of a thumb seldom used in typing. Further, in this case, it is preferred to configure the key change area in a specific position of the space key, such as a position biased toward a hand relatively not used to operate the space key, with reference to the center. In general, like the other keys, the space key tends to be operated with the same finger. Therefore, the key change area is set to the side of the hand opposite to the other hand most often used to operate the space key to enable a display of the backspace key without disturbing the touch operation to the space key.

For example, the designation of the hand most often used to operate the space key may be set by the user, or by accumulating a typing history of the user and making an analysis from the tendency of this typing history. In some embodiments, a typing history storage unit and an identification unit are provided, wherein the typing history storage unit stores a user's typing history of the software keyboard, and the identification unit, from this typing history, identifies whether the hand operating the space key is the right hand or the left hand. A correction key may then be displayed in a half area of the space key on the side corresponding to the hand that is not the hand identified by the identification unit. The identification unit can identify either the right hand or the left hand by determining, for example, whether the right side or the left side of the space key is more frequently operated.

The "correction keys" are keys related to correction, which include, for example, at least one of a backspace key and a delete key. The correction keys may also include a cursor key to identify a position to be corrected. Here, the backspace key is a key to delete a character, symbol, or the like just before the cursor position, and the delete key is a key to delete a character, symbol, or the like just after the cursor position.

In addition to the above example, the configuration of the key change table may also be changed by the user, which enhances convenience and improves usability.

In some embodiments, the "right side of the space key" is registered as the key change area, and the "backspace key" is registered as the type of correction key.

In some embodiments, the touch operation detection unit 32 is a function implemented by the touch sensor 24 in FIG. 2 to detect the position coordinates of a touch operation when a touch operation is detected and output the position coordinates to the key determination unit 33.

In some embodiments, the key determination unit 33, the determination unit 34, and the display control unit 35 are functions implemented by the CPU 20 illustrated in FIG. 2, wherein the CPU 20 executes a predetermined program stored in the flash memory 25.

The key determination unit 33 refers to the input conversion table stored in the storage unit 31 to determine a key or keys corresponding to the coordinates of the touch operation from the touch operation detection unit 32 and output the determination result to the determination unit 34.

The determination unit 34 refers to the touch operation determination table stored in the storage unit 31 to determine whether a touch operation in the home position is carried out. Specifically, in one embodiment, when at least two of "F," "D," "S," "A," "J," "K," "L," and "-" are contained in key information inputted from the key determination unit 33, the determination unit 34 determines that the touch operation was carried out in the home position and outputs the determination result to the display control unit 35.

The display control unit 35 switches between display/ non-display of the software keyboard on the display unit 36. After the determination unit 34 sends the determination result specifying that the touch operation was carried out in the home position while the software keyboard 12 was displayed, the display control unit 35 changes the keyboard layout displayed on the display unit 36 according to the key change table stored in the storage unit 31. Specifically, a correction key is displayed in an area set as the key change area. Therefore, when an operation in the key change area is detected, the key registered as the key change area is made to function as the correction key newly displayed, rather than the previous key function. This control may also be performed by a control unit different from the display control unit 35.

Figure 6:
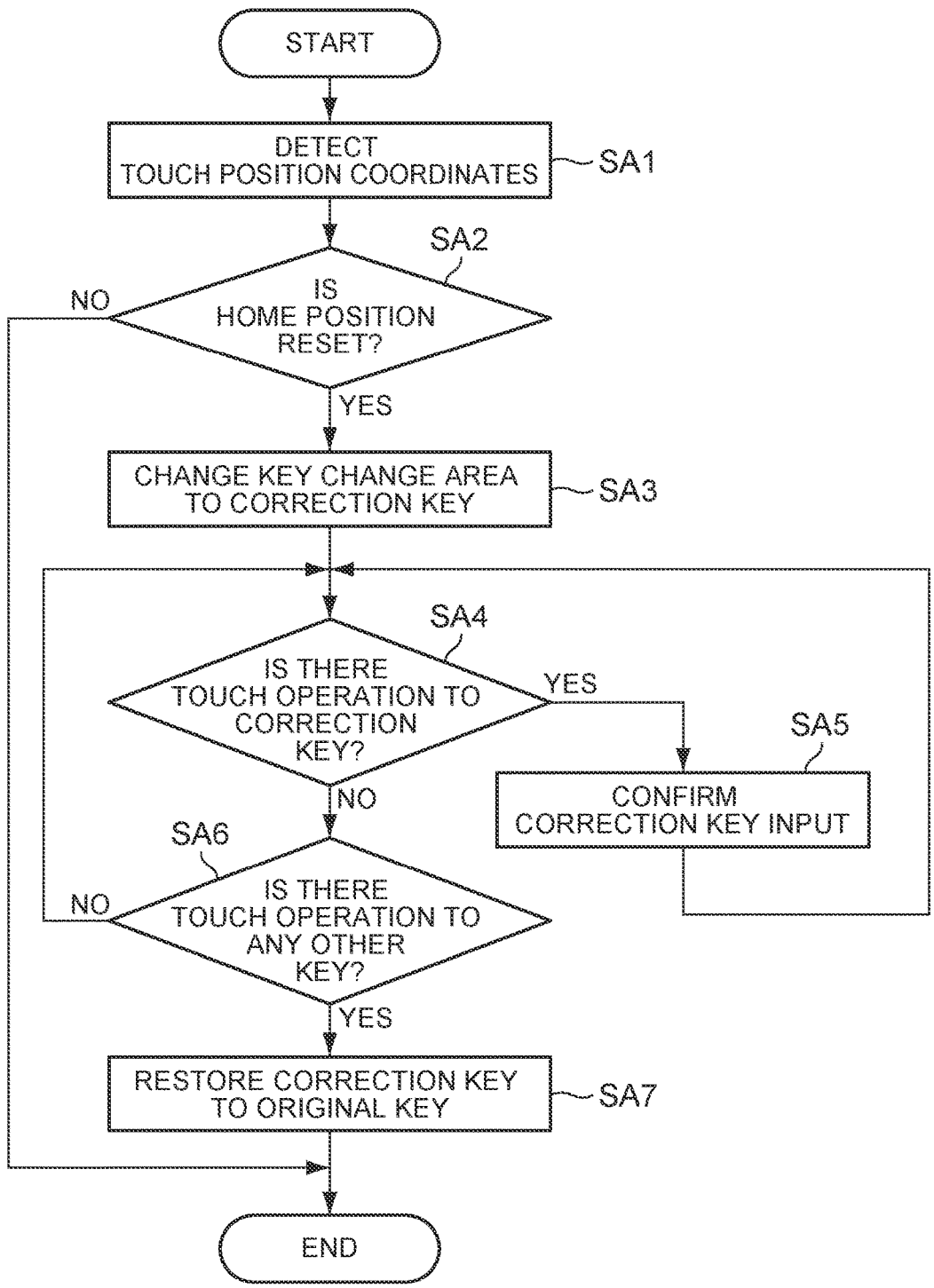
FIG. 6 is a flowchart diagram illustrating one embodiment of a processing procedure of a keyboard display processing method.

Next, a processing procedure of a keyboard display method will be described with reference to FIG. 6. FIG. 6 is a flowchart diagram illustrating one embodiment of a processing procedure of a keyboard display function.

First, when a touch operation is performed on the screen keyboard 12 (see FIG. 1), the touch position coordinates are detected (step SA1). Then, an input key is determined from the touch position coordinates, and it is further determined, from the determined key input, whether a touch operation was carried out in the home position (step SA2).

Figure 7:
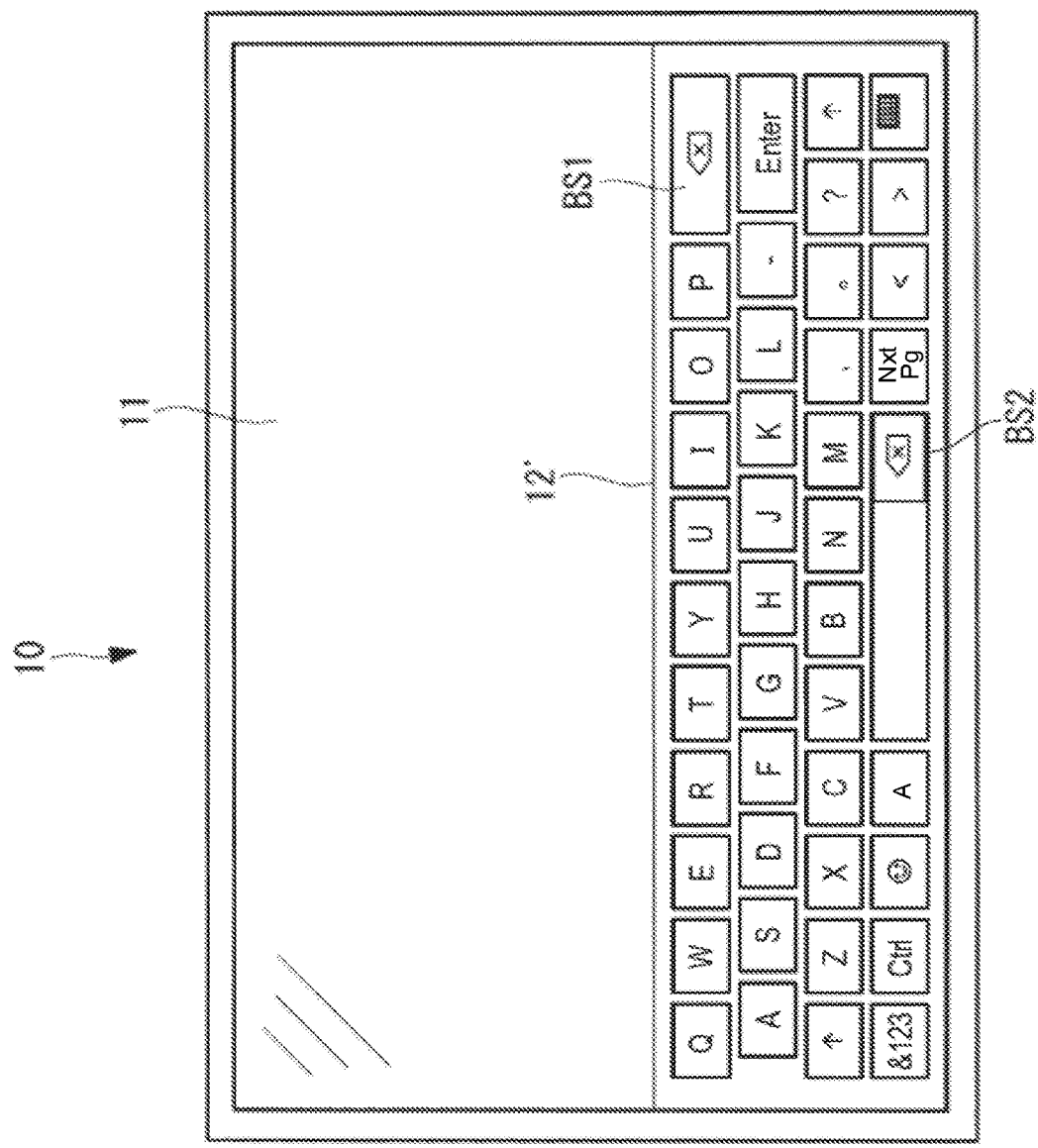
FIG. 7 is a schematic appearance diagram illustrating one embodiment of a keyboard layout after a correction key is displayed.

When it is determined in step SA2 that the touch operation was not carried out in the home position (NO in step SA2), the processing is ended. However, when it is determined that the touch operation was carried out in the home position (YES in step SA2), a key change area on the software keyboard is changed to a correction key according to the key conversion table (step SA3). Thus, for example, a backspace key appears in a part of the screen previously occupied by the right side of the space key as illustrated in FIG. 7. As a result, two backspaces BS1, BS2 are displayed on a software keyboard 12.

Then, it is determined whether a touch operation is carried out to a newly displayed correction key, such as the backspace key BS2 in FIG. 7 (step SA4). When the correction key is operated (YES in step SA4), the input operation to the correction key is confirmed (step SA5). For example, when a touch operation to the newly displayed backspace key BS2 is carried out, backspace processing is performed. On the other hand, when no touch operation is carried out to either correction key (NO in step SA4), it is then determined whether any other key is operated (step SA6). When it is determined that any other key is not operated (NO in step SA6), the procedure returns to step SA4. On the other hand, when it is determined in step SA6 that any other key is operated (YES in step SA6), the layout is restored to the original keyboard layout (step SA7). For example, if it is determined in step SA6 that another key is operated, the backspace key BS2 (see FIG. 7) displayed in a part of the space key disappears, and the space key area is restored again.

As described above regarding the information processing apparatus, the software keyboard display method, and the program of the embodiment, a home position operation can be performed when a typing error occurs to display a correction key in a pre-registered key change area. Part or all of at least one key included in one of the areas A and B illustrated in FIG. 5, or a predetermined area including at least one key can be set as the key change area to display a correction key in a position operable by the user without moving her hands away from the home position. As a result, a correction operation is enabled while maintaining the hands in the home position, and the productivity of typing can be improved.

A portion of the space key is set as the key change area to enable effective use of a thumb seldom used in typing. Also, the backspace is displayed in a position close to the hand opposite the hand most often used to operate the space key to allow the user to operate the backspace without disturbing the operation of pushing the space key.

Further, the user can change the setting of the key change area so that the user can display a desired correction key in a user's favorite location. For example, it is possible to change "F" key to the backspace key and "J" key to the delete key. Thus, a correction key(s) can be newly displayed in a location of which the user thinks as being easy to operate, resulting in improving the productivity and usability.

Furthermore, since the home position is maintained even when the correction operation is completed, the user can shift to the next key input operation smoothly.

While the present subject matter has been described with reference to the aforementioned embodiments, the technical scope of the disclosure is not limited to the scope of the aforementioned embodiments. Various changes or modifications can be added to the aforementioned embodiments without departing from the scope of the disclosure, and forms to which such changes or modifications are made shall be included in the technical scope of this disclosure.

For example, embodiments in which the software keyboard is displayed on the touch panel have been described in the aforementioned embodiments, but the technical scope of the disclosure is not limited to this form. For example, other embodiments comprise an input operation performed using a software keyboard projected onto a location other than the touch panel, such as a desk, paper, or an arm, or into the air, and shall be included in the technical scope of this disclosure. The "touch operation" in this case means that a touch to a key is detectable by an input detection unit that detects input operations. The input detection unit in such a case is a unit corresponding to the touch sensor 24 in the aforementioned embodiments, which is, in some embodiments, comprises an image acquisition unit such as a camera, an image analysis unit implemented as a software function, and the like.

Note further that the "sensing area" is an area in which a touch operation is detectable by the input detection unit mentioned above.

Embodiments may be practiced in other specific forms. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An information processing apparatus configured to enable an input operation using a software keyboard, comprising:
    a touch operation detection unit that detects a touch operation to the software keyboard by reading a touch sensor to detect position coordinates of the touch operation and outputting the position coordinates to an input conversion table stored in computer readable storage media to determine one or more keys of the software keyboard corresponding to the position coordinates of the touch operation;
    a determination unit that determines whether the touch operation detected by the touch operation detection unit is a touch operation in a home position in response to detecting a simultaneous touch operation of two or more keys associated with a touch determination table item registered as the home position; and
    a control unit that changes a key change area comprising an area of at least a portion of a space key of the software keyboard to a correction key after the determination unit determines that the touch operation is the touch operation in the home position, wherein the key change area is set to be biased toward a hand opposite another hand most often used to operate the space key, with reference to a specific position of the space key;
    wherein said units comprise one or more of a hardware circuit, a programmable hardware device, and code executable by a processor of the information processing apparatus, the code stored on one or more non-transitory computer readable storage media.

2. The information processing apparatus of claim 1, wherein:
    the software keyboard comprises a standard QWERTY layout; and
    the key change area is set to an area substantially at an end of the software keyboard at least even with, if not below, the row of keys of containing the letter "F".

3. The information processing apparatus of claim 1, wherein:
    the software keyboard comprises a standard QWERTY layout; and
    the key change area is set to an area in a substantially central portion of the software keyboard at least even with, if not below, the row of keys containing the letter "F".

4. The information processing apparatus of claim 1, wherein:

the correction key comprises a key that erases at least one character before a cursor position.

5. The information processing apparatus of claim 1, wherein:
the correction key comprises a key that erases at least one character after a cursor position.

6. The information processing apparatus of claim 1, further comprising:
a typing history storage unit that stores a user's typing history of the software keyboard; and
an identification unit that identifies, from the typing history, whether a hand operating the space key is a right hand or a left hand,
wherein the key change area is set based on an identification result of the identification unit.

7. The information processing apparatus of claim 1, wherein:
the control unit changes a setting of the key change area to display the correction key in a location determined by a user.

8. The information processing apparatus of claim 1, wherein:
the control unit restores the key change area to an original state after a touch operation to a key other than the correction key is carried out during a state wherein the key change area has been changed to the correction key.

9. The information processing apparatus of claim 1, wherein:
after a touch operation to at least two points is carried out substantially simultaneously, the determination unit determines that the touch operation in the home position is carried out.

10. The information processing apparatus of claim 9, wherein:
when at least two keys of "F," "D," "S," "A," "J," "K," "L," and "-" are touched simultaneously, the determination unit determines that the touch operation in the home position is carried out.

11. The information processing apparatus of claim 9, wherein:
when at least two keys of "F," "D," "S," "A," "J," "K," "L," and ";" are touched simultaneously, the determination unit determines that the touch operation in the home position is carried out.

12. A method for displaying a software keyboard, comprising:
determining whether a simultaneous touch operation of at least two points is made in a sensing area comprising a home position of the software keyboard of an electronic apparatus;
biasing a preset display change area comprising at least a part of a space key of the software keyboard toward a hand opposite another hand most often used to operate the space key; and
displaying a correction key in the preset display change area in response to determining that the simultaneous touch operation of two or more points is made in the sensing area.

13. The method of claim 12, wherein:
the home position comprises an area of a row of letters containing an "F" key of a QWERTY keyboard.

14. The method of claim 12, additionally comprising:
removing the correction key from the preset display change area after a touch input is made to a key other than the correction key.

15. A computer program product comprising a non-transitory computer readable storage medium that stores code executable by a processor, the executable code comprising code to perform:
processing for displaying a software keyboard in a sensing area as an area in which a touch operation is detectable, comprising:
determining a simultaneous touch operation of at least two points in the sensing area; and
displaying a correction key in a preset display change area comprising at least a portion of a space key of the software keyboard in response to detecting a simultaneous touch operation of two or more points in the sensing area corresponding to a home position, wherein the key change area is set to be biased toward a hand opposite another hand most often used to operate the space key, with reference to a specific position of the space key.

* * * * *